(12) United States Patent
Ashitaka (10) Patent No.: US 12,371,331 B2
(45) Date of Patent: Jul. 29, 2025

(54) METHOD FOR PRODUCING SILICA SOL

(71) Applicant: FUJIMI INCORPORATED, Kiyosu (JP)

(72) Inventor: Keiji Ashitaka, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 0 days.

(21) Appl. No.: 18/543,060

(22) Filed: Dec. 18, 2023

(65) Prior Publication Data

US 2024/0116763 A1 Apr. 11, 2024

Related U.S. Application Data

(63) Continuation of application No. 16/498,121, filed as application No. PCT/JP2018/003393 on Feb. 1, 2018, now abandoned.

(30) Foreign Application Priority Data

Mar. 30, 2017 (JP) ................................ 2017-067969

(51) Int. Cl.
*C01B 33/145* (2006.01)

(52) U.S. Cl.
CPC ................................ *C01B 33/145* (2013.01)

(58) Field of Classification Search
CPC .............................................. C01B 33/14–148
See application file for complete search history.

(56) References Cited

U.S. PATENT DOCUMENTS

| | | |
|---|---|---|
| 2001/0011105 A1 | 8/2001 | Noguchi |
| 2007/0237701 A1 | 10/2007 | Yamakawa et al. |
| 2012/0202923 A1 | 8/2012 | Iriguchi et al. |

FOREIGN PATENT DOCUMENTS

| | | | | |
|---|---|---|---|---|
| CN | 101492164 A | * | 7/2009 | |
| CN | 102390838 A | * | 3/2012 | |
| JP | S61-158810 A | | 7/1986 | |
| JP | 63-112411 A | | 5/1988 | |
| JP | H02-243508 A | | 9/1990 | |
| JP | H03-208813 A | | 9/1991 | |
| JP | H06-048720 A | | 2/1994 | |
| JP | H06-087608 A | | 3/1994 | |
| JP | 07221059 A | * | 8/1995 | |
| JP | 10203820 A | * | 8/1998 | |
| JP | H11-060232 A | | 3/1999 | |
| JP | 2005-060217 A | | 3/2005 | |
| JP | 2014-198649 A | | 10/2014 | |
| KR | 2005116470 A | * | 12/2005 | ............. C01B 33/14 |
| KR | 10-2012-0085290 A | | 7/2012 | |
| TW | 200604097 A | | 2/2006 | |

OTHER PUBLICATIONS

Machine Translation of JPH07-221059A. Aug. 18, 1995. (Year: 1995).*
Machine Translation of KR2005-0116470A. Dec. 13, 2005. (Year: 2005).*
Machine Translation of JPH10-203820A. Aug. 4, 1998. (Year: 1998).*
Machine Translation of CN101492164A. Jul. 29, 2009. (Year: 2009).*
Machine Translation of CN102390838A. Mar. 28, 2012. (Year: 2012).*
Arai et al., "Synthesis of Nano Silica Particles for Polishing Prepared by Sol-Gel Method," Journal of Sol-Gel Science and Technology, 2004, vol. 32 (pp. 79-83).
US Final Office Action in U.S. Appl. No. 16/498,121 dated Jul. 15, 2022.
Graf, Silica, Amorphous. Kirk-Othmer Encyclopedia of Chemical Technology, 2018. (pp. 1-43).
KR Office Action in KR Appl. Ser. No. 10-2019-7028015 dated Nov. 4, 2022.
Office Action issued in corresponding Japanese application No. 2017-067969 dated Oct. 13, 2020.
Office Action issued in corresponding Korean Patent Application No. 10-2019-7028015 dated Jun. 9, 2023.
Office Action issued in corresponding Taiwanese Patent Application No. 107105173 dated Mar. 23, 2023.
Office Action issued in corresponding Taiwanese Patent Application No. 107105173 dated May 24, 2021.
Tetramethoxysilane Information. Gelest. https://www.gelest.com/product/SIT7110.0/. As viewed on Jul. 6, 2022. (Year: 2022).
US Final Office Action in U.S. Appl. No. 16/498,121 dated Jul. 19, 2023.
US Non-Final Office Action in U.S. Appl. No. 16/498,121 dated Mar. 18, 2022.
US Non-Final Office Action in U.S. Appl. No. 16/498,121 dated Jan. 27, 2023.
Machine Translation of JPH03-208813A, Sep. 12, 1991 (Year: 1991).
Machine Translation of JP63-112411A, May 17, 1988 (Year: 1988).
Written Translation of Table 1 of JP63-112411A, May 17, 1988 (Year: 1988).

* cited by examiner

*Primary Examiner* — Stephen E Rieth
(74) *Attorney, Agent, or Firm* — Foley & Lardner LLP (57) ABSTRACT

Provided is a method for producing a silica sol. A gel-like material cannot be generated and highly associated silica particles can be obtained. A method for producing a silica sol comprises a step of making a reaction liquid by mixing liquid (A) comprising an alkaline catalyst, water, a first organic solvent and silica particles for association with liquid (B) comprising at least one of tetramethoxysilane and a condensate thereof and a second organic solvent, wherein during the mixing, an addition rate of the liquid (B) is $8.5 \times 10^{-4}$ to $5.6 \times 10^{-3}$ (mol of silicon atoms in liquid (B)/mol of water in liquid (A)) per minute.

6 Claims, 3 Drawing Sheets

METHOD FOR PRODUCING SILICA SOL

CROSS-REFERENCE TO RELATED PATENT APPLICATIONS

This application is a continuation application of U.S. patent application Ser. No. 16/498,121, filed on Sep. 26, 2019, which is a national stage entry of PCT/JP2018/003393, filed on Feb. 1, 2018, which claims priority to Japanese Patent Application No. 2017-067969, filed on Mar. 30, 2017. The contents of these applications are hereby incorporated by reference in their entireties.

TECHNICAL FIELD

The present invention relates to a method for producing a silica sol.

BACKGROUND ART

Conventionally, a production method using a sodium silicate solution, which is referred to as water glass, as a starting material is known as a method for producing a silica sol (Patent Literature 1). In this production method, the sodium silicate solution is treated once with a cation exchange resin to remove ions such as sodium ion, so that purity as a starting material is increased, and then the resultant is used for the production of a silica sol.

However, in the production method of Patent Literature 1, high purification of a starting material by ion exchange has limitations.

Then, as a method for obtaining a high purity silica sol, methods using hydrolysis of a high purity, alkoxysilane such as ethyl orthosilicate are disclosed.

Patent Literature 2 discloses that monodispersed spherical silica can be obtained by separately performing a pretreatment step of hydrolyzing an alkoxysilane with a solution containing an alkoxysilane, an aqueous alkali solution and an organic solvent, and a main reaction step of condensation polymerizing the hydrolysate obtained in the foregoing step onto the surface of silica particles dispersed in a solvent. Further, Patent Literature 3 discloses that cocoon-shaped silica particles can be obtained by dropping a mixture of methyl silicate and methanol into a mixed solvent consisting of water, methanol and ammonia, and controlling the time of reaction of methyl silicate with water at that time.

Silica sol in use as an abrasive grain contained in a polishing composition in so-called chemical mechanical polishing (CMP), in which a semiconductor substrate is polished to planarize. In such a case, it is desirable to obtain a high friction at the time of polishing and further improve the polishing rate by deforming (highly associating) silica particles.

CITATION LIST

Patent Literatures

Patent Literature 1: JPS61-158810 A
Patent Literature 2: JPH06-87608 A
Patent Literature 3: JPH11-60232 A

SUMMARY OF INVENTION

However, although the technology of Cited Literature 2 can obtain monodispersed spherical silica, it has a problem that highly associated silica particles cannot be obtained, and the technology of Patent Literature 3 has a problem that if a dropping rate is raised in order to make highly associated silica particles, a gel-like material is generated.

Then, the present invention is devised in view of the described situation, and an object thereof is to provide a method for producing a silica sol by which highly associated silica particles can be obtained without generating a gel-like material.

The present inventor diligently studied in view of the above-described problems. As a result, the present invention has been accomplished by finding that the above-described effect can be obtained by a method for producing a silica sol comprising making a reaction liquid by mixing a liquid (A) comprising an alkaline catalyst, water, a first organic solvent and silica particles for association with a liquid (B) comprising at least one of tetramethoxysilane and a condensate thereof and a second organic solvent, wherein during the mixing, an addition rate of the liquid (B) is $8.5 \times 10^{-4}$ to $5.6 \times 10^{-3}$ mol/min in terms of silicon atoms with respect to 1 mol of the water contained in the liquid (A).

DESCRIPTION OF EMBODIMENTS

Embodiments of the present invention are described below, but the present invention is not limited only to the following embodiments. In addition, unless otherwise indicated, manipulation and measurement of physical properties or the like are carried out under the conditions of at room temperature (20 to 25° C.) and relative humidity of 40 to 50% RH.

The present invention is a method for producing a silica sol, comprising a step of making a reaction liquid by mixing a liquid (A) comprising an alkaline catalyst, water, a first organic solvent and silica particles for association (also simply referred to as "liquid (A)" herein) with a liquid (B) comprising at least one of tetramethoxysilane and a condensate thereof and a second organic solvent (also simply referred to as "liquid (B)" herein), wherein during the mixing, an addition rate of the liquid (B) is $8.5 \times 10^{-4}$ to $5.6 \times 10^{-3}$ mol/min in terms of silicon atoms with respect to 1 mol of the water contained in the liquid (A). According to this configuration, in the method for producing a silica sol of the present invention, it is possible to obtain highly associated silica particles without generating a gel-like material.

Although the reason why the above-described effects are shown by the production method of the present invention is not necessarily clear, it is thought as follows.

Generally, in the production of a silica sol, by raising the addition rate of a silica raw material, highly associated silica particles can be obtained but, on the other hand, a non-filterable gel-like material may be generated. Therefore, it was difficult to obtain highly associated silica particles without generating a gel-like material.

In the production method of the present invention, generation of a gel-like material can be suppressed by bringing the addition rate of the liquid (B) within a prescribed range. Further, in the production method of the present invention, since the liquid (A) contains silica particles for association and the liquid (B) contains at least one of tetramethoxysilane and a condensate thereof as a raw material, it is possible to obtain highly associated silica particles. Furthermore, it is possible to make the particle size of silica particles larger. That is, since tetramethoxysilane and a condensate thereof are high in hydrolysis reactivity, the concentration of tetramethoxysilane hydrolyzed in a reaction liquid can be increased sharply at the initial stage of the reaction by adding the liquid (B) to the liquid (A). It is thought that due to the rapid increase in the concentration of the hydrolyzed tetramethoxysilane, silica particles for association previously present in the reaction system grow while associating and highly associated particles are obtained without generating a gel-like material.

It is noted that the above-described mechanism is based on speculation and its correctness does not affect the technical scope of the present invention.

Constituent features of the method for producing a silica sol of the present invention are described below.

Liquid (A) Comprising an Alkaline Catalyst, Water, a First Organic Solvent and Silica Particles for Association The liquid (A) according to the present invention can be prepared by mixing an alkaline catalyst, water, a first organic solvent, and silica particles for association. The liquid (A) can contain other components in addition to the alkaline catalyst, water, the first organic solvent and the silica particles for association as long as the effects of the present invention are not impaired.

In a preferred embodiment of the present invention, the liquid (A) consists of the alkaline catalyst, water, the first organic solvent and the silica particles for association. By the liquid (A) containing nothing other than the alkaline catalyst, water, the first organic solvent, and the silica particles for association, impurities contained the produced silica sol can be reduced as much as possible. As a result, when using the resulting silica sol as a polishing slurry, it is possible to suppress the influence of impurities on polishing and to facilitate control of slurry properties with respect to the target characteristics by additives at the time of polishing slurry composition formation. Moreover, it can be used also for the use in which metal impurities are disliked, such as silicon wafers and device wafers, and a polishing slurry which is applicable widely can be provided.

As the alkaline catalyst contained in the liquid (A), conventionally known ones can be used. From the viewpoint that contamination of a metallic impurity or the like can be reduced as much as possible, examples of the alkaline catalyst include ammonia, ammonium salts such as tetramethylammonium hydroxide and the like, ethylene diamine, diethylene triamine, triethylene tetramine, urea, monoethanolamine, diethanolamine, triethanolamine, tetramethylquanidine, and the like. Among these, ammonia and ammonium salts such as tetramethyl ammonium hydroxide are more preferable from the viewpoint of excellent catalytic action, and ammonia is even more preferable. That is, in a preferred embodiment of the present invention, the alkaline catalyst is ammonia. Since ammonia is highly volatile, it can be easily removed from the above-described silica sol. The alkaline catalyst may be used solely, or two or more of the alkaline catalysts may be used in combination. The alkaline catalyst may also be in the form of an aqueous solution.

As the water contained in the liquid (A), from the viewpoint of reducing contamination of a metallic impurity or the like as much as possible, it is preferable to use pure water or ultrapure water. When the above-described alkaline catalyst is in the form of an aqueous solution or when the below-described silica particles for association are colloidal silica, the water contained therein is the water contained in the liquid (A). Therefore, it is preferable that the water contained in the aqueous solution of the alkaline catalyst, the colloidal silica or the like be also pure water or ultrapure water.

As the first organic solvent contained in the liquid (A), a hydrophilic organic solvent is preferably used, and specifically, examples thereof include alcohols such as methanol, ethanol, n-propanol, isopropanol, ethylene glycol, propylene glycol, and 1,4-butanediol; and ketones such as acetone and methyl ethyl ketone, and the like. The first organic solvent may be used solely, or two or more of the first organic solvents may be used in combination.

Especially in the present invention, as the above-described first organic solvent, alcohols are preferred. Using an alcohol has an effect that when water substitution (described below) of the above-described silica sol is carried out, the alcohol can be easily substituted with water by heat distillation. Further, from the viewpoint of recovery and reuse of organic solvents, it is preferable that the first organic solvent be methanol, which is of the same type as an alcohol generated by hydrolysis of tetramethoxysilane.

The silica particles for association contained in the liquid (A) are not particularly limited, but it is preferable to use colloidal silica from the viewpoint of low content of impurities. In addition, the colloidal silica may, for example, be one produced by a sol-gel method. The production of colloidal silica by a sol-gel method can be carried out using a conventionally known method, and specially, colloidal silica can be obtained by performing a hydrolysis-condensation reaction using a hydrolyzable silicon compound (for example, an alkoxysilane or a derivative thereof) as a raw material. As the silicon compound, only one species may be used singly, or two or more species may be used in combination.

The particle size of the silica particles for association is not particularly limited and it can be appropriately chosen in order to make the silica particles contained in the silica sol produced into a desired particle size.

The lower limit of the average primary particle size of the silica particles for association is preferably 2 nm or more, more preferably 5 nm or more, and even more preferably 10 nm or more. The upper limit of the average primary particle size of the silica particles for association is preferably 200 nm or less, more preferably 100 nm or less, and even more preferably 50 nm or less. The primary particle size of the silica particles for association can be calculated using the equation: the primary particle size=6000/(SA×2.2), based on the specific surface area (SA) of the silica particles calculated from the BET method, assuming that the true specific gravity of silica is 2.2 g/cm$^3$.

The lower limit of the average secondary particle size of the silica particles for association is preferably 5 nm or more, more preferably 10 nm or more, and even more preferably 15 nm or more. The upper limit of the average secondary particle size of the silica particles for association is preferably 300 nm or less, more preferably 150 nm or less, and even more preferably 75 nm or less. As a value of the average secondary particle size of the silica particles for association, a value measured as a volume average particle size by a dynamic light scattering method using a particle size distribution measurement apparatus (UPA-UT151, manufactured by NIKKISO CO., LTD.) is adopted.

The content of each component in the liquid (A) is not particularly limited, and it can be appropriately adjusted in order to make silica particles contained in the manufactured silica sol into a desired particle size, shape, or the like.

In one embodiment of the present invention, the chemical reaction to produce a silica sol is represented by the following reaction formula (1).

[Chemical formula 1]

Reaction formula (1)

Rate determining factors of the reaction in producing a silica sol are the amounts of tetramethoxysilane ($Si(OCH_3)_4$) as a starting material, water ($H_2O$) for hydrolysis, and an alkaline catalyst as a catalyst. Therefore, when the reaction temperature and the addition rate are constant in the liquid (A), the particle size of the silica particles contained in the silica sol produced can be controlled by adjusting the contents of the water and the alkaline catalyst. The molar ratio of the alkaline catalyst to the water in the liquid (A) is preferably 0.01 to 0.30, and more preferably 0.03 to 0.13. If the molar ratio is 0.01 or more, the alkaline catalyst can exhibit an action as a hydrolysis catalyst. From the viewpoint of productivity and cost, it is preferable that the molar ratio be 0.30 or less.

The lower limit of the content of the first organic solvent in the liquid (A) is preferably 10% by weight or more, and more preferably 20% by weight or more with respect to the whole amount (100% by weight) of the liquid (A). From the viewpoint of productivity, the upper limit of the content of the first organic solvent is preferably 98% by weight or less, and more preferably 95% by weight or less with respect to the whole amount of (100% by weight) of the liquid (A).

The lower limit of the content of the silica particles for association in the liquid (A) is preferably 0.005 to 10% by weight, and more preferably 0.01 to 1.00% by weight with respect to the whole amount (100% by weight) of the liquid (A).

The method for producing the Liquid (A) is not particularly and it can be obtained, for example, by stirring and mixing an alkaline catalyst, water, a first organic solvent, silica particles for association, and other components as necessary.

Liquid (B) Comprising at Least One of Tetramethoxysilane and Condensate Thereof and Second Organic Solvent The liquid (B) according to the present invention can be prepared by mixing at least one of tetramethoxysilane and a condensate thereof with a second organic solvent. In the present specification, "at least one of tetramethoxysilane and a condensate thereof" is also collectively referred to simply as "tetramethoxysilane and/or the like". From the viewpoints of adjusting the reaction rates of hydrolysis and polycondensation of tetramethoxysilane and/or the like, suppressing the generation of a gel-like material, and miscibility, etc., the liquid (B) is preferably prepared by dissolving tetramethoxysilane and/or the like in an organic solvent.

The liquid (B) may contain other components in addition to the at least one of tetramethoxysilane and a condensate thereof and the second organic solvent as long as the effects of the present invention are not impaired.

In a preferred embodiment of the present invention, the liquid (B) consists of the at least one of tetramethoxysilane and a condensate thereof and the second organic solvent. When the liquid (B) contains only the at least one of tetramethoxysilane and a condensate thereof and the second organic solvent, impurities contained in the silica sol produced can be reduced as much as possible. As a result, when using the resulting sol as a polishing slurry, it is possible to suppress the influence of impurities on polishing and to facilitate control of slurry properties with respect to the target characteristics by additives at the time of polishing composition formation. Moreover, it can be used also for the use in which metal impurities are disliked, such as silicon wafers and device wafers, and a polishing slurry which is applicable widely can be provided.

As the second organic solvent contained in the liquid (B), a hydrophilic organic solvent is preferably used, and specifically, examples thereof include alcohols such as methanol, ethanol, n-propanol, isopropanol, ethylene glycol, propylene glycol, and 1,4-butanediol; and ketones such as acetone and methyl ethyl ketone, and the like. The second organic solvent may be used solely, or two or more of the second organic solvents may be used in combination.

In the present invention, as the above-described second organic solvent, alcohols are more preferred. Using an alcohol has an effect that when water substitution (described below) of the above-described silica sol is carried out, the alcohol can be easily substituted with water by heat distillation. Further, from the viewpoint of recovery and reuse of organic solvents, it is more preferable that the first organic solvent be methanol, which is of the same type as an alcohol generated by hydrolysis of tetramethoxysilane. Therefore, in the production method of the present invention, it is particularly preferable that the first organic solvent and the second organic solvent be methanol.

The contents of the tetramethoxysilane and/or the like and the second organic solvent in the liquid (B) are not particularly limited and can be appropriately adjusted so that the addition rate of the liquid (B) can be brought into a desired range. The content of the tetramethoxysilane and/or the like in the liquid (B) is 30% by weight or more and less than 100% by weight with respect to the whole amount (100% by weight) of the liquid (B), and from the viewpoint of compatibility with the liquid (A), it is more preferably 70 to 90% by weight.

The tetramethoxysilane condensate in the liquid (B) is, for example, a di- to dodecamer, preferably a tetra- to octamer.

The method for producing the liquid (B) is not particularly limit, and from the viewpoint of miscibility, it is preferably obtained by stirring and mixing the second organic solvent with tetramethoxysilane and/or the like and other components as necessary.

Step of Making Reaction Liquid

The production method of the present invention includes the step of making a reaction liquid by mixing liquid (A)

with liquid (B). When the liquid is mixed with the liquid (B), the concentration of hydrolyzed tetramethoxysilane in the reaction liquid rapidly rises, whereby the silica particles for association start to associate. At the same time, the associated silica particles for association can be grown by hydrolysis and polycondensation of tetramethoxysilane and/or the like.

In the present specification, the "reaction liquid" is a liquid made by mixing liquid (A) with liquid (B) and means a liquid in a state in which hydrolysis and polycondensation of tetramethoxysilane and/or the like are going to proceed (including before proceeding). Further, "silica sol" means a liquid in which the above-mentioned hydrolysis and polycondensation have completed.

The silica sol produced may be used as it is according to its application, or may be filtered with a prescribed filter and then used for various applications, or may be used as a liquid obtained after performing the water substitution step or concentration step described later or as an organosol dispersed in an organic solvent.

When mixing the liquid (A) with the liquid (B), it is preferable to stir the liquid (A). The stirring speed is not particularly limited and is, for example, 30 to 500 rpm.

When the liquid (A) is mixed with the liquid (B), the addition rate of the liquid (B) is $8.5 \times 10^{-4}$ to $5.6 \times 10^{-3}$ mol/min in terms of silicon atoms with respect to 1 mol of the water contained in the liquid (A). If the addition rate of the liquid (B) is less than $8.5 \times 10^{-4}$ mol/min, highly associated silica particles cannot be obtained. In addition, if the addition rate of the liquid (B) exceeds $5.6 \times 10^{-3}$ mol/min, a gel-like material is generated. By controlling the concentration of the alkaline catalyst, the temperature of the reaction liquid, etc. within the range of the addition rate, highly associated silica particles with various shapes can be obtained. The lower limit of the addition rate of the liquid (B) is preferably $1.0 \times 10^{-3}$ mol/min or more. The upper limit of the addition rate of the liquid (B) is preferably $5.0 \times 10^{-3}$ mol/min or less, more preferably $4.0 \times 10^{-3}$ mol/min or less, and even more preferably $3.0 \times 10^{-3}$ mol/min or less. The term "in terms of silicon atoms" means that the number of moles of the silicon atoms contained in tetramethoxysilane and a condensate thereof is defined as the number of moles of tetramethoxysilane and a condensate thereof. For example, 1 mol of tetramethoxysilane is 1 mol in terms of silicon atoms. When the condensate of tetramethoxysilane is a tetramer, 1 mol of the condensate corresponds to 4 mol in terms of silicon atoms.

When the liquid (A) is mixed with the liquid (B), the addition method of the liquid (B) is not particularly limited as long as the addition rate of the above-described Liquid (B) can be obtained, and either continuous addition or divided addition (for example, dropping) may be employed.

The temperature of the reaction liquid is preferably 5 to 100° C., mere preferably 5 to 70° C. When the temperature of the reaction liquid is 5° C. or higher, tetramethoxysilane can be mixed without being solidified. When the temperature of the reaction liquid is 100° C. or less, volatilization of the organic solvent, etc. can be prevented. Moreover, when using ammonia as the alkaline catalyst, it is preferably 70° C. or less from the viewpoint of particle design.

In the method for producing a silica sol of the present invention, the step of making a reaction liquid can be carried out under any pressure conditions of reduced pressure, normal pressure and increased pressure. However, from the viewpoint of production cost, it is preferably carried out under normal pressure.

The particle size of the silica particles in the silica sol produced by the production method of the present invention is not particularly limited, and a desired particle size can be chosen. The average primary particle size of the silica particles is, for example, 5 to 200 nm, preferably 30 to 100 nm. The average secondary particle size of the silica particles is, for example, 10 to 1000 nm, preferably 50 to 250 nm.

The primary particle size of the silica particles described above can be calculated using the equation: the primary particle size=$6000/(SA \times 2.2)$, based on the specific surface area (SA) of the silica particles calculated from the BET method, assuming that the true specific gravity of silica is 2.2 g/cm$^3$. As a value of the average secondary particle size of the silica particles described above, a value measured as a volume average particle size by a dynamic light scattering method using a particle size distribution measurement apparatus (UPA-UT151, manufactured by NIKKISO CO., LTD.) is adopted.

In the production method of the present invention, highly associated silica particles can be obtained. Herein, "highly associated" means having a shape in which a plurality of particles are observed to coalesce and be formed in a two-dimensional or three-dimensional manner in SEM observation. Therefore, in the production method of the present invention, it is possible to obtain silica particles having a shape deformed more than a cocoon shape, for example, a chain-like shape or a branched shape.

The shape and the average aspect ratio of colloidal silica can be grasped by, for example, electron microscope observation. As a specific procedure for grasping the average aspect ratio, for example, using a scanning electron microscope (SEM), for a prescribed number (for example, 200) of independent particles whose shape is recognizable, smallest rectangles circumscribing each particle image are drawn. Then, for the rectangle drawn for each of the particle images, a value obtained by dividing the length of the longer side (value of the major axis) by the length of the shorter side (value of the minor axis) is calculated as the major axis/minor axis ratio (aspect ratio). The average aspect ratio can be determined by arithmetically averaging the aspect ratios of the above-mentioned prescribed number of particles.

The particle size, the shape, and the like of the silica particles in the silica sol can be controlled by the number and the particle size of silica particles for association, the addition rate of tetramethoxysilane and/or the like, the temperature of the reaction liquid, the concentration of the alkaline catalyst, etc.

Post-Processing Step

In the method for producing a silica sol of the present invention, in addition to the above-described step of making a reaction liquid, a post-processing step described below may be carried out.

Specifically, at least one of a water substitution step of substituting an organic solvent present in the silica sol with water and a concentration step of concentrating the silica sol may be carried out. More specifically, a concentration step of concentrating the silica sol may be carried out solely; a water substitution step of substituting an organic solvent present in the silica sol with water may be carried out solely; after the concentration step, a water substitution step of substituting an organic solvent in the concentrated liquid with water may be carried out; or, after the water substitution step is carried out, a concentration step of concentrating the water-substituted liquid may be carried out. Further, multiple concentration steps may be carried out, wherein a water substitution step may be carried out between a concentration step and another concentration step; for example, after a concentration step, a water substitution step of substituting an organic solvent in a concentrated liquid with water is carried out, and then another concentration step of concentrating the water-substituted liquid may be further carried out.

Water Substitution Step

The method for producing a silica sol of the present invention may comprise, as one embodiment, a step of substituting an organic solvent contained in the silica sol with water (also simply referred to as "water substitution step" herein). The silica sol of this embodiment includes an embodiment in which it is a silica sol having been subjected to a concentration step (a concentrated silica sol).

When ammonia is chosen as an alkaline catalyst by substituting an organic solvent in the silica sol with water, a pH of the silica sol can be adjusted to a neutral region, and a water-substituted silica sol stable for a long period can be obtained by removing unreacted materials contained in the silica sol.

As a method of substituting an organic solvent in the silica sol with water, a conventionally known method can be used, and examples of the method include a method of substitution by using heat distillation by dropping water while keeping a liquid quantity of the silica sol at a certain level or more. In this case, the substitution operation is preferably continued until liquid temperature and overhead temperature reach the boiling point of water for substitution.

As water to be used in this step, from the viewpoint of reducing contamination of a metallic impurity or the like as much as possible, pure water or ultrapure water is preferably used.

Further, examples of the method of substituting an organic solvent in a silica sol with water also include a method of separating silica particles by centrifugal separation of a silica sol followed by redispersing the resultant in water.

Concentration Step

The method for producing a silica sol of the present invention may further comprise, as one embodiment, a step of concentrating the silica sol (also simply referred to as "concentration step" herein). The silica sol of this embodiment also includes an embodiment of being a silica sol having been subjected to a water substitution step (a water-substituted a silica sol).

The method of concentrating a silica sol is not particularly limited, and a conventionally known method can be used, and examples thereof include a heat concentration method, a membrane concentration method, and the like.

In a heat concentration method, a concentrated silica sol can be obtained by heat concentrating a silica sol under atmospheric pressure or under reduced pressure.

In a membrane concentration method, a silica sol can be concentrated, for example, through membrane separation by ultrafiltration in which silica particles can be filtered. A molecular weight cut-off of an ultrafiltration membrane is not particularly limited, and the molecular weight cut-off can be chosen according to a particle size of produced particles. The material constituting an ultrafiltration membrane is not particularly limited, and examples thereof include polysulfone, polyacrylonitrile, sintered metal, ceramics, carbon, and the like. The form of an ultrafiltration membrane is not particularly limited, and examples thereof include a spiral type, a tubular type, a hollow fiber type, and the like. In an ultrafiltration method, operation pressure is not particularly limited, and it can be set at a pressure not exceeding a working pressure of an ultrafiltration membrane to be used.

Applications of Silica Sol

The silica sol produced by the production method of the present invention can be used in various applications. Especially, it can be suitably used as abrasive grains for polishing an object to be polished such as a semiconductor substrate. Examples of the object to be polished include metals or semimetals such as silicon materials, aluminum, nickel, tungsten, steel, tantalum, titanium and stainless steel, and alloys thereof; glassy materials such as quartz glass, aluminosilicate glass and glassy carbon; ceramic materials such as alumina, silica, sapphire, silicon nitride, tantalum nitride and titanium carbide; compound semiconductor substrate materials such as silicon carbide, gallium nitride and gallium arsenide; resin materials such as polyimide resin, and the like. Further, the silica sol produced by the production method of the present invention can be used for filler for resin (for example, filler for encapsulation of semiconductor elements), hard coating agents, resin modifiers, surface treatment agents, paints, pigments, catalysts, antislipping agents, spacers of liquid crystal display devices, fiber processing agents, binders, adhesives, polymer flocculants, toners, cleaning agents, cosmetics, dental materials, nanocomposites, thermosensitive recording materials, photosensitive films, precipitating agents and the like.

EXAMPLES

The present invention is described in more detail using the following Examples and Comparative Examples. However, the technical scope of the present invention is not limited to the following Examples. Unless otherwise indicated, "%" and "parts" mean "% by weight" and "parts by weight", respectively. In the following Examples, unless otherwise indicated, operations were carried out under conditions of at room temperature (25° C.) and relative humidity of 40 to 50% RH.

Example 1

A liquid (A) prepared by mixing 2945 g of methanol with 375.92 g of pure water, 108 g of 29% by weight ammonia water and 91 g of colloidal silica (silica concentration: 12% by weight, average secondary particle size: 25 nm) was added to a 5-L reaction vessel with a stirrer having a cooling function, and with stirring at 300 rpm, a liquid (B) prepared by dissolving 309 g of tetramethoxysilane (TMOS) in 79 g of methanol was added at 11 mL/min while maintaining the liquid temperature in the reaction vessel at 20° C., and thus a reaction liquid was prepared and a silica sol was obtained.

Example 2

A liquid (A) prepared by mixing 2945 g of methanol with 295.84 g of pure water, 108 g of 29% by weight ammonia water and 182 g of colloidal silica (silica concentration: 12% by weight, average secondary particle size: 25 nm) was added to a 5-L reaction vessel with a stirrer having a cooling function, and with stirring at 300 rpm, a liquid (B) prepared by dissolving 309 g of tetramethoxysilane (TMOS) in 79 g of methanol was added at 11 mL/min while maintaining the liquid temperature in the reaction vessel (reaction liquid temperature) at 20° C., and thus a reaction solution was prepared and a silica sol was obtained.

Comparative Example 1

A liquid (A) prepared by mixing 2945 g of methanol with 456 g of pure water and 108 g of 29 wt % ammonia water was added to a 5-L reaction vessel with a stirrer having a cooling function, and with stirring at 300 rpm, a liquid (B) prepared by dissolving 309 g of tetramethoxysilane (TMS) in 79 g of methanol was added at 11 mL/min while maintaining the liquid temperature in the reaction vessel at 20° C., and thus a reaction liquid was prepared and a silica sol was obtained.

Comparative Example 2

A silica sol was obtained in the same manner as in comparative Example 1 except that the liquid temperature in the reaction vessel was changed so as to be kept at 10° C. instead of 20° C.

Comparative Example 3

A silica sol was obtained in the same manner as in Comparative Example 1 except that the addition rate of the liquid (B) was changed from 11 mL/min to 66 mL/min.

Comparative Example 4

A silica sol was obtained in the same manner as in Comparative Example 1 except that the addition rate of the liquid (B) was changed from 11 mL/min to 100 mL/min.

Example 3

A liquid (A) prepared by mixing 2945 g of methanol with 404.46 g of pure water, 162 g of 29% by weight ammonia water and 15 g of colloidal silica (silica concentration: 12% by weight, average secondary particle size: 25 nm) was added to a 5-L reaction vessel with a stirrer having a cooling function, and with stirring at 300 rpm, a liquid (B) prepared by dissolving 309 g of tetramethoxysilane (TMOS) in 79 g of methanol was added at 11 mL/min while maintaining the liquid temperature in the reaction vessel at 20° C., and thus a reaction liquid was prepared and a silica sol was obtained.

Comparative Example 5

A liquid (A) prepared by mixing 2945 g of methanol with 416.66 g of pure water and 162 g of 29% by weight ammonia water was added to a 5-L reaction vessel with a stirrer having a cooling function, and with stirring at 300 rpm, a liquid (B) prepared by dissolving 309 g of tetramethoxysilane (TMOS) in 79 g of methanol was added at 11 mL/min while maintaining the liquid temperature in the reaction vessel at 20° C., and thus a reaction liquid was prepared and a silica sol was obtained.

Example 4

A liquid prepared by mixing 2945 g of methanol with 323.5 g of pure water, 162 g of 29% by weight ammonia water and 107 g of colloidal silica (silica concentration: 12% by weight, average secondary particle size: 25 nm) was added to a 5-L reaction vessel with a stirrer having a cooling function, and with stirring at 300 rpm, a liquid (B) prepared by dissolving 309 g of tetramethoxysilane (TMOS) in 79 g of methanol was added at 11 mL/min while maintaining the liquid temperature in the reaction vessel at 30° C., and thus a reaction liquid was prepared and a silica sol was obtained.

Comparative Example 6

A silica sol was obtained in the same manner as in Comparative Example 5 except that the liquid temperature in the reaction vessel was changed so as to be kept at 30° C. instead of 20° C.

Example 5

A liquid (A) prepared by mixing 2945 g of methanol with 373.15 g of pure water, 218 g of 29% by weight ammonia water and 5.4 g of colloidal silica (silica concentration: 12% by weight, average secondary particle size: 25 nm) was added to a 5-L reaction vessel with a stirrer having a cooling function, and with stirring at 300 rpm, a liquid (B) prepared by dissolving 309 g of tetramethoxysilane (TMOS) in 79 g of methanol was added at 11 mL/min while maintaining the liquid temperature in the reaction vessel at 20° C., and thus a reaction liquid was prepared and a silica sol was obtained.

Comparative Example 7

A liquid (A) prepared by mixing 2945 g of methanol with 377.9 g of pure water and 218 g of 29% by weight ammonia water was added to a 5-L reaction vessel with a stirrer having a cooling function, and with stirring at 300 rpm, a liquid (B) prepared by dissolving 309 g of tetramethoxysilane (TMOS) in 79 g of methanol was added at 11 mL/min while maintaining the liquid temperature in the reaction vessel at 20° C., and thus a reaction liquid was prepared and a silica sol was obtained.

Example 6

A silica sol was obtained in the same manner as in Example 1 except that the addition rate of the liquid (B) was changed from 11 mL/min to 5.5 mL/min.

Comparative Example 8

A liquid (A) prepared by mixing 2945 g of methanol with 411.36 g of pure water, 108 g of 29% by weight ammonia water and 46.5 g of colloidal silica (silica concentration: 4% by weight, average secondary particle size: 8 nm) was added to a 5-L reaction vessel with a stirrer having a cooling function, and with stirring at 300 rpm, a liquid (B) prepared by dissolving 309 g of tetramethoxysilane (TMS) in 79 g of methanol was added at 2.46 mL/min while maintaining the liquid temperature in the reaction vessel at 20° C., and thus a reaction liquid was prepared and a silica sol was obtained.

Comparative Example 9

A silica sol was obtained in the same manner as in Comparative Example 8 except that the addition rate of the liquid (B) was changed from 2.46 mL/min to 0.74 mL/min.

Comparative Example 10

A silica sol was obtained in the same manner as in Example 1 except that the addition rate of the liquid (B) was changed from 11 mL/min to 33 mL/min.

The configuration of the liquid (A), the configuration of the liquid (B), the addition rate of the liquid (B), and the temperature of the reaction liquid employed in Examples 1 to 6 and Comparative Examples 1 to 10 are summarizes in Table 1.

other hand, in the silica sols of Comparative Examples 3 and 4, although the generation of a gel-like material was confirmed, but it was not in a millimeter scale, so that the particle size of silica particles was measured using the above-mentioned apparatus.

TABLE 1

| | Liquid (A) | | | | | | Liquid (B) | | Addition rate of liquid (B) | | Temperature of reaction liquid |
|---|---|---|---|---|---|---|---|---|---|---|---|
| | Methanol (g) | Water (g) | $NH_3$ (g) | Silica particle for association (g) | Molar ratio of $NH_3$ to water | TMOS (g) | Methanol (g) | | mL/min | mol/min*[1] | °C. |
| Example 1 | 2945 | 532.68 | 31.32 | 10.92 | 0.06 | 309 | 79 | | 11 | $1.9 \times 10^{-03}$ | 20 |
| Example 2 | 2945 | 532.68 | 31.32 | 21.84 | 0.06 | 309 | 79 | | 11 | $1.9 \times 10^{-03}$ | 20 |
| Comparative Example 1 | 2945 | 532.68 | 31.32 | 0 | 0.06 | 309 | 79 | | 11 | $1.9 \times 10^{-03}$ | 20 |
| Comparative Example 2 | 2945 | 532.68 | 31.32 | 0 | 0.06 | 309 | 79 | | 11 | $1.9 \times 10^{-03}$ | 10 |
| Comparative Example 3 | 2945 | 532.68 | 31.32 | 0 | 0.06 | 309 | 79 | | 66 | $1.1 \times 10^{-02}$ | 20 |
| Comparative Example 4 | 2945 | 532.68 | 31.32 | 0 | 0.06 | 309 | 79 | | 100 | $1.7 \times 10^{-02}$ | 20 |
| Example 3 | 2945 | 532.68 | 46.98 | 1.8 | 0.09 | 309 | 79 | | 11 | $1.9 \times 10^{-03}$ | 20 |
| Comparative Example 5 | 2945 | 532.68 | 46.98 | 0 | 0.09 | 309 | 79 | | 11 | $1.9 \times 10^{-03}$ | 20 |
| Example 4 | 2945 | 532.68 | 46.98 | 12.84 | 0.09 | 309 | 79 | | 11 | $1.9 \times 10^{-03}$ | 30 |
| Comparative Example 6 | 2945 | 532.68 | 46.98 | 0 | 0.09 | 309 | 79 | | 11 | $1.9 \times 10^{-03}$ | 30 |
| Example 5 | 2945 | 532.68 | 62.64 | 0.648 | 0.12 | 309 | 79 | | 11 | $1.9 \times 10^{-03}$ | 20 |
| Comparative Example 7 | 2945 | 532.68 | 62.64 | 0 | 0.12 | 309 | 79 | | 11 | $1.9 \times 10^{-03}$ | 20 |
| Example 6 | 2945 | 532.68 | 31.32 | 10.92 | 0.06 | 309 | 79 | | 5.5 | $9.4 \times 10^{-04}$ | 20 |
| Comparative Example 8 | 2945 | 532.68 | 31.32 | 1.86 | 0.06 | 309 | 79 | | 2.46 | $4.2 \times 10^{-04}$ | 20 |
| Comparative Example 9 | 2945 | 532.68 | 31.32 | 1.86 | 0.06 | 309 | 79 | | 0.74 | $1.3 \times 10^{-04}$ | 20 |
| Comparative Example 10 | 2945 | 532.68 | 31.32 | 10.92 | 0.06 | 309 | 79 | | 33 | $5.7 \times 10^{-03}$ | 20 |

*[1]Addition rate of liquid (B) (in terms of silicon atoms) with respect to 1 mol of water contained in liquid (A)

Measurement Method of Various Physical Properties

Physical properties of the above-obtained silica sols of Examples and Comparative Examples were measured by the following methods.

Measurement of Particle Size

As the value of the average secondary particle size of the silica particles contained in a silica sol obtained, a value measured as a volume average particle size by a dynamic light scattering method using a particle size distribution measurement apparatus (UPA-UT151, manufactured by NIKKISO CO., LTD.) was employed. In addition, the value of the average primary particle size of the silica particles contained in a silica sol was calculated using the formula: primary particle size=6000/(SA×2.2) on the basis of a specific surface area (SA) of silica particles calculated from the BET method on the assumption that the true specific gravity of silica is 2.2 g/cm$^3$. The results are shown in Table 2.

In addition, the silica sol of Comparative Example 10 had a large number of millimeter-scale huge sediments (gel-like materials), and it was not possible to measure the particle size with the above-mentioned apparatus. Therefore, in Table 2 below, it is expressed by "unmeasurable". On the Confirmation of Presence or Absence of Gel-Like Material Regarding the silica sols obtained, the presence or absence of generation of a gel-like material immediately after obtaining the silica sols using the methods described in the above Examples and Comparative Examples was confirmed by visual inspection. The results are shown in Table 2.

Moreover, regarding the silica sols obtained, the possibility of filtration of silica particles with a φ47 mm filter having an aperture of 5 μm was confirmed. The results are shown in Table 2. In Table 2 below, "○" indicates that the filtration was possible, and "×" indicates that it was impossible to carry out filtration because of being a gel-like material.

SEM Observation

Figure 1:
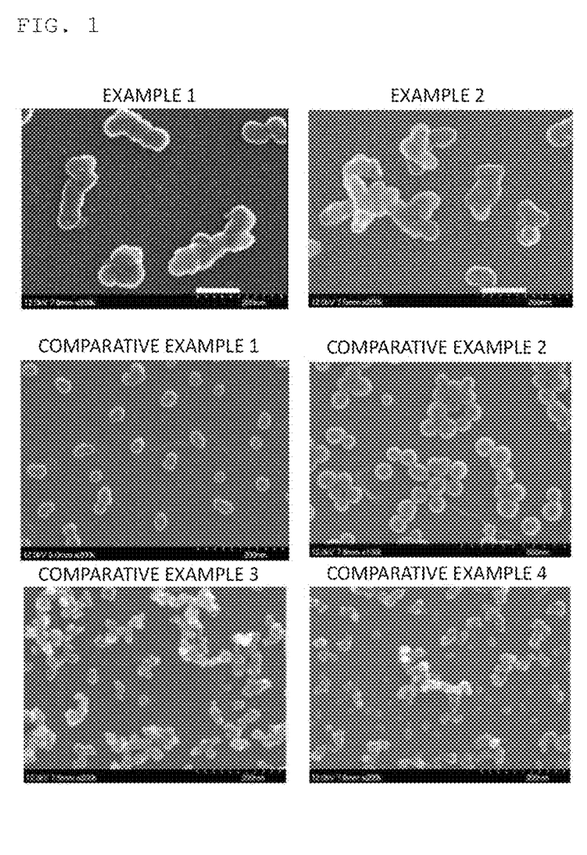
FIG. 1 shows photographs of the silica sols obtained in Examples 1 and 2 and Comparative Examples 1 to 4 observed by a scanning electron microscope (SEM) (magnification: 200,000 times).
Figure 2:
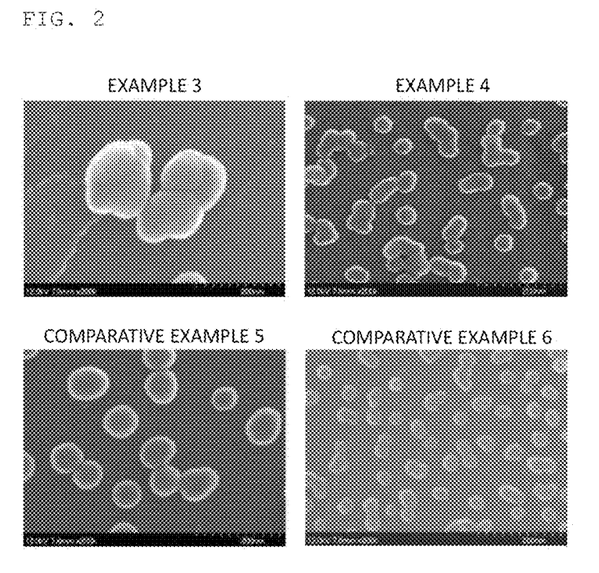
FIG. 2 shows photographs of the silica sols obtained in Examples 3 to 4 and Comparative Examples 5 to 6 observed by a scanning electron microscope (SEM) (magnification: 200,000 times).
Figure 3:
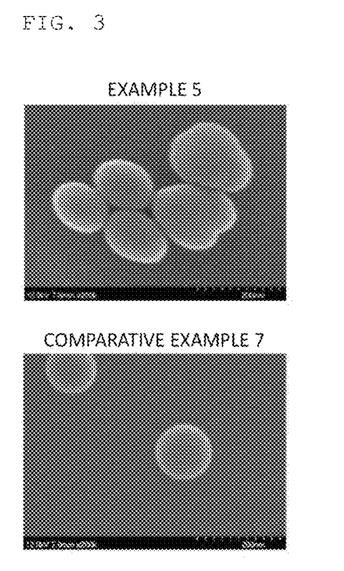
FIG. 3 shows photographs of the silica sols obtained in Example 5 and Comparative Example 7 observed by a scanning electron microscope (SEM) (magnification: 200,000 times).
Figure 4:
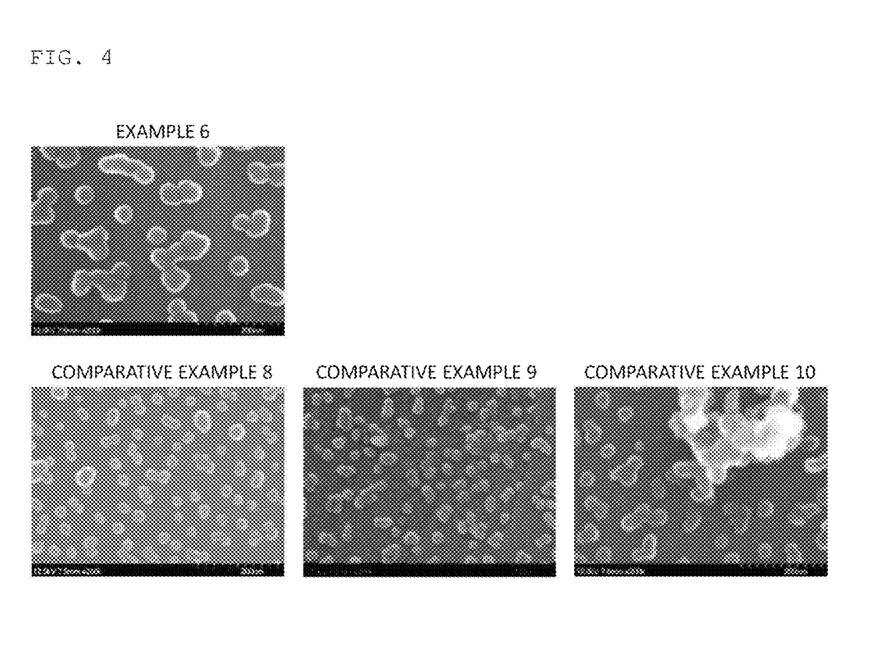
FIG. 4 shows photographs of the silica sols obtained in Example 6 and Comparative Examples 8 to 10 observed by a scanning electron microscope (SEM) (magnification: 200,000 times).

The silica sols obtained were observed using a scanning electron microscope (SEM) S4700 (manufactured by Hitachi High-Technologies Corporation). The photographs (magnification: 200,000 times) observed by SEM are shown in FIGS. 1 to 4.

TABLE 2

| | Silica sol | | | |
|---|---|---|---|---|
| | Silica particle | | | |
| | Average primary particle size (nm) | Average secondary particle size (nm) | Filtration | Gel-like material |
| Example 1 | 34 | 103 | ○ | No |
| Example 2 | 33 | 198 | ○ | No |
| Comparative Example 1 | 23 | 44 | ○ | No |
| Comparative Example 2 | 47 | 87 | ○ | No |
| Comparative Example 3 | 12 | 74 | x | Yes |
| Comparative Example 4 | 11 | 71 | x | Yes |
| Example 3 | 75 | 202 | ○ | No |
| Comparative Example 5 | 51 | 81 | ○ | No |
| Example 4 | 32 | 62 | ○ | No |
| Comparative Example 6 | 24 | 42 | ○ | No |
| Example 5 | 84 | 153 | ○ | No |
| Comparative Example 7 | 83 | 113 | ○ | No |
| Example 6 | 34 | 65 | ○ | No |
| Comparative Example 8 | 24 | 44 | ○ | No |
| Comparative Example 9 | 13 | 19 | ○ | No |
| Comparative Example 10 | Unmeasurable | Unmeasurable | x | Yes |

As shown in Table 2 and FIGS. 1 to 4, it can be seen that in the Examples, it is possible to produce a silica sol containing silica particles with a higher degree of association as compared with the Comparative Examples. In addition, in the cases of the Examples, it can be seen that, silica particles having a medium particle size (average secondary particle size: 50 to 80 nm) and a large particle size (average secondary particle size: more than 80 nm) in addition to high degrees of association are obtained.

The present application is based on Japanese Patent Application No. 2017-067969 filed on Mar. 30, 2017, the disclosed content of which is cited by reference in its entirety.

The invention claimed is:

1. A method for producing a silica sol, comprising making a reaction liquid by mixing only a liquid (A) and a liquid (B) to obtain the silica sol, and substituting methanol contained in the silica sol with water:

the liquid (A) consisting of an alkaline catalyst, water, methanol, and silica particles for association, with the liquid (B) consisting of:

at least one of tetramethoxysilane and a condensate thereof; and methanol, wherein during the mixing, an addition rate of the liquid (B) is $8.5 \times 10^{-4}$ to $5.6 \times 10^{-3}$ (mol of silicon atoms in liquid (B)/mol of the water in liquid (A)) per minute, wherein a content of tetramethoxysilane and a condensate thereof is 70% by weight or more and less than 100% by weight with respect to the whole amount of the liquid (B), wherein the silica particles for association are colloidal silica, wherein the silica particles for association have an average secondary particle size of 5 nm or more to 300 nm or less, wherein a molar ratio of the alkaline catalyst to the water in the liquid (A) is 0.06 to 0.30, and wherein a content of the silica particles for association in the liquid (A) is 0.005% to 1.00% by weight, with respect to the total weight of the liquid (A).

2. The production method according to claim 1, wherein the alkaline catalyst is ammonia.

3. The production method according to claim 1, wherein the liquid (B) consists of tetramethoxysilane and methanol.

4. The production method according to claim 1, wherein a temperature of the reaction liquid is 5 to 100° C.

5. The production method according to claim 1, wherein a temperature of the reaction liquid is 5 to 70° C.

6. The production method according to claim 1, wherein silica particles in the silica sol have a chain-like shape or a branched shape.

* * * * *